United States Patent [19]

Markham et al.

[11] Patent Number: 4,802,444
[45] Date of Patent: Feb. 7, 1989

[54] THERAPEUTIC PET TOY

[75] Inventors: Joseph P. Markham; Peter Emily, both of Lakewood, Colo.

[73] Assignee: Bounce, Inc., Lakewood, Colo.

[21] Appl. No.: 73,484

[22] Filed: Jul. 15, 1987

[51] Int. Cl.⁴ .............................................. A01K 15/00
[52] U.S. Cl. .......................................................... 119/29
[58] Field of Search .............. 119/29, 29.5; 128/62 A, 128/136, 359; 272/95; D30/160, 199

[56] References Cited

U.S. PATENT DOCUMENTS

| D. 234,789 | 4/1975 | Rosenberg | D34/15 E |
| D. 234,790 | 4/1975 | Rosenberg | D34/15 A |
| D. 256,958 | 9/1980 | Markham | D30/160 |
| 670,487 | 3/1901 | Van Wagner | 273/341 |
| 1,006,182 | 10/1911 | Cousin | 119/29.5 |
| 1,149,170 | 4/1915 | Allis | 119/29.5 |
| 2,131,229 | 9/1937 | McMennamin | 119/29 X |
| 2,185,547 | 1/1940 | Fowler | 46/1 |
| 2,194,736 | 3/1940 | De Bruler | 272/86 |
| 2,966,908 | 1/1961 | Cathcart et al. | 128/136 |
| 3,071,476 | 1/1963 | Werft et al. | 128/359 |
| 3,198,173 | 8/1965 | Fisher | 119/29 |
| 3,830,202 | 8/1974 | Garrison | D30/160 |
| 4,513,014 | 4/1985 | Edwards | 426/132 |
| 4,557,219 | 12/1985 | Edwards | 119/29.5 |

FOREIGN PATENT DOCUMENTS 1957185 5/1971 Fed. Rep. of Germany ... 128/62 A

Primary Examiner—Robert Peshock
Assistant Examiner—R. Thomas Price
Attorney, Agent, or Firm—Fields, Lewis, Pittenger & Rost

[57] ABSTRACT

Disclosed is a dental hygienic pet toy for dental prophylaxis on the teeth of a dog or other carnivore as the toy is chewed by the carnivore. The toy includes an elastomeric body having an outer surface and at least one groove which opens onto the outer surface. The groove is sized and configured so that a functional prophylaxis lip will scrape plaque and other debris from a tooth and gingiva of a carnivore which is repeatedly inserted into and at least partially withdrawn from the groove as the toy is chewed by the carnivore. An oral hygiene substance may be provided along the lip to enhance the benefit to the teeth and gingiva.

21 Claims, 2 Drawing Sheets

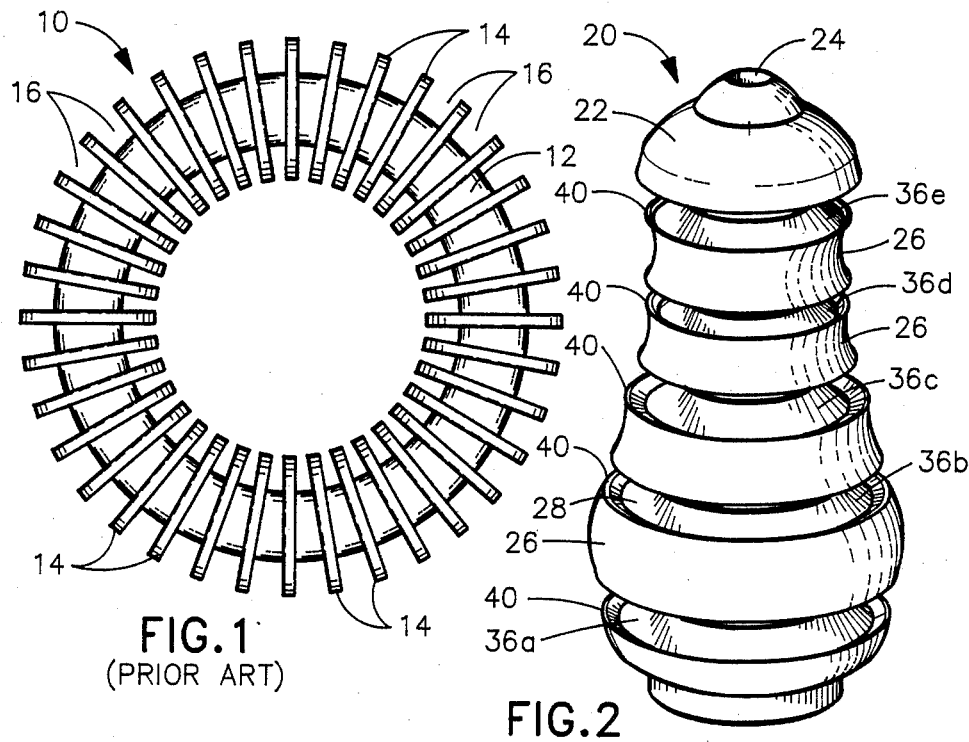
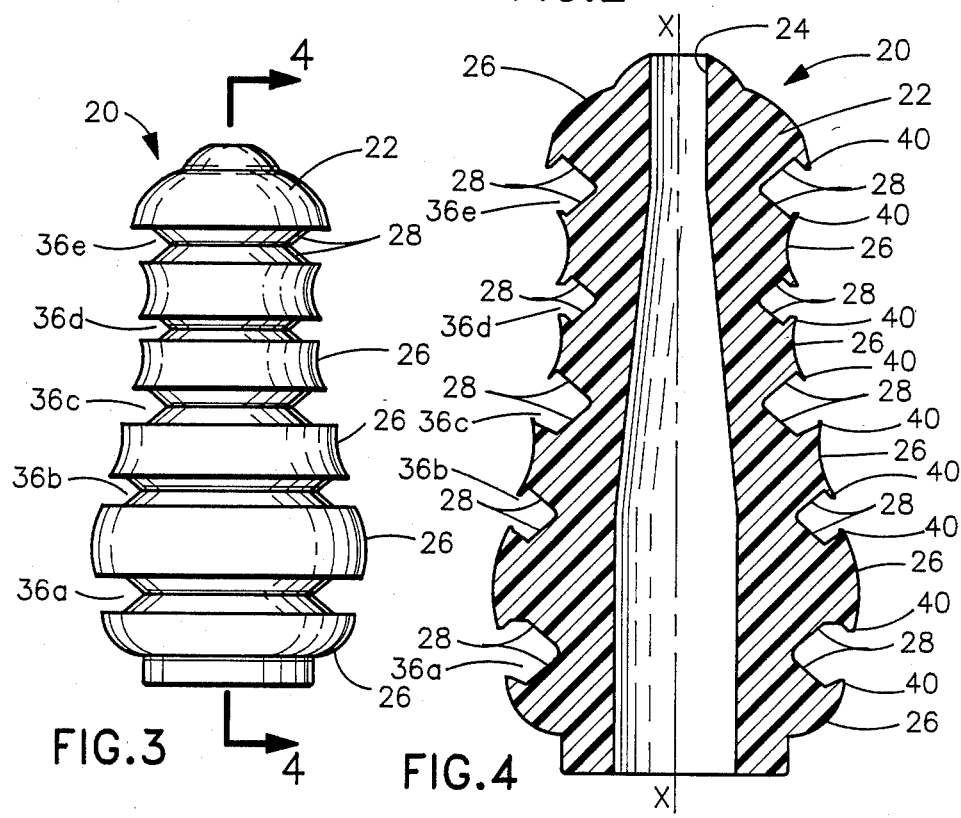

THERAPEUTIC PET TOY

TECHNICAL FIELD

The invention relates generally to a toy for pets, and, more particularly, to a pet toy which additionally is of value as a dental hygienic aid for pets.

BACKGROUND ART

Play toys for use by pets, particularly dogs, have been commercially available for years. Those particularly designed for dogs are generally shaped like a dog bone. However, dog toys having ring-like and ball shapes are also sometimes seen in the marketplace. Most dog toys are also made from a rubber-like material so that the toy will bounce when played with by the dog. Researchers studying dog behavior discovered years ago that dogs prefer toys having bouncing characteristics.

U.S. Pat. No. Des. 256,958 which issued on Sept. 16, 1980 to Markham, a coinventor of the present invention, discloses a pet toy, preferably made from rubber, which provides pets, primarily dogs, with masticatory exercise when they chew the toy. The toy has two circumferentially extending shallow grooves which facilitate a dog's chewing of the toy.

U.S. Pat. Nos. Des. 234,789 and Des. 234,790 to Rosenberg disclose sounding toys having spiraling members which define chambers for housing objects secured therein. The objects rattle when a pet plays with the toy. The toy is not disclosed as having any utility as a chewing toy for pets, nor does the design lend itself to such utility. While the toys are possibly resilient in a direction parallel to the toy's longitudinal axis, the spiraling members would not appear to provide the toy with much give or elasticity in a direction perpendicular to the longitudinal axis. Accordingly, it is unlikely that a dog would chew these toys.

U.S. Pat. No. 2,194,736 to De Bruler discloses a tether pet toy which includes a dog bone shaped member which is attached to an elastic string-like member. The string-like member is attached to the dog bone member by wrapping and tying it about two lips provided on the dog bone. The lips prevent the string-like member from slipping off the dog bone.

U.S. Pat. No. 3,198,173 to Fisher discloses a pet toy made from a strip of rawhide wound and rolled into a loosely coiled configuration.

U.S. Pat. No. 2,185,547 to Fowler discloses a pet toy having a core which is covered by two pieces of rawhide sewn together.

U.S. Pat. Nos. 4,513,014 and 4,557,219 to Edwards disclose a dog bone shaped tough molded elastomeric chewable polyurethane toy for an animal. The toy has a longitudinal groove extending along a substantial portion of its midsection. The groove facilitates flexing of the dog bone at opposite sides of the groove to provide a satisfying crunching effect to the chewer.

The aforementioned patents demonstrate that very few pet toys have been specifically designed with features that are directed to improving a dog's dental health. Some of the more resilient or rubber-like toys described above inherently provide some massaging of a dog's gums as the dog chews the toy, but few are specifically designed for such purpose. Moreover, none of the toys discussed above were developed for the purpose of scraping or scaling plaque and other debris from a dog's teeth.

DISCLOSURE OF THE INVENTION

The present invention addresses the aforementioned dental hygiene concerns of carnivores, such as dogs, by providing a pet toy which not only provides masticatory exercise for a dog or other carnivore, but also performs dental prophylaxis as the dog chews the toy. The toy is also capable of massaging portions of the dog's gingiva or gums which lie adjacent to the dog's teeth.

The toy includes an elastomeric body having an outer surface and at least one groove which opens onto the outer surface. The groove is sized and configured to scrape plaque and other debris from the tooth and gingiva of a carnivore which is being repeatedly inserted into the groove and at least partially withdrawn from the groove as the carnivore chews the toy.

In a preferred embodiment, the elastomeric body of the toy is also provided with an inner surface which defines an inner hollow core. The hollow core enhances tooth and gingival scraping when a dog chews the toy by providing the body with the capability of resiliently bowing into the hollow core. The bowing action causes the groove having a dog's tooth inserted therein to resiliently elongate which thereby causes the sides of the groove to move inwardly towards each other. This inward movement of the groove sides results in clamping or engagement of the tooth located in the groove, which thereby results in scraping of the tooth's side and neck and the dog's gingiva surrounding the neck of the tooth. The elastomeric material of the toy body preferably has a hardness which facilities bowing of the body into the hollow core and elongation of the grooves as the animal chews the toy. The resilient nature of the elastomeric material also provides the toy with the ability to bounce as a dog plays with the toy. This keeps the dog's interest and thus insures that the dog will chew the toy for a while, thereby cleaning teeth and gingiva, as desired.

In addition, the toy preferably has a functional prophylaxis lip located between each groove side and the toy's adjacent outer side. The lips partially project over the opening of the groove and are sized and configured to scrape a tooth as it is inserted into and withdrawn from the groove.

BRIEF DESCRIPTION OF THE DRAWINGS

FIG. 1 is a top plan view of a prior art pet toy.

FIG. 2 is a perspective view of a dental hygienic play toy of the present invention.

FIG. 3 is a side view of the pet toy illustrated in FIG. 2.

FIG. 4 is a cross sectional view taken along the lines 4—4 of FIG. 3.

BEST MODE FOR CARRYING OUT THE INVENTION

Figure 5:
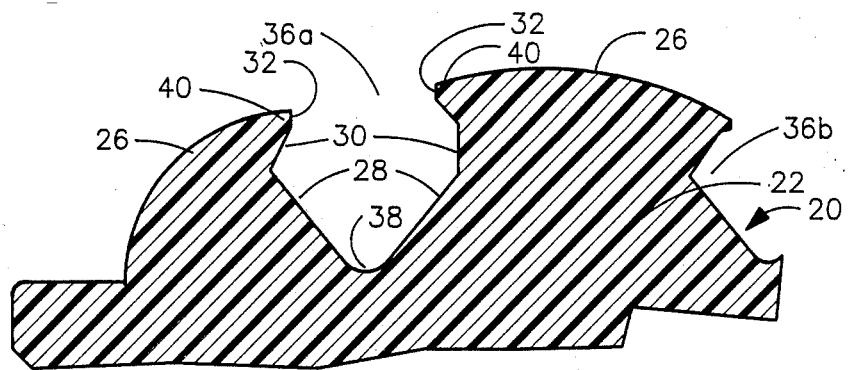
FIG. 5 is an enlarged partial cross sectional view of a groove illustrated in FIG. 4.

FIG. 1 discloses a ring-shaped dog toy 10 distributed by Pet Land of Chillicothe, Ohio 45601. The toy is apparently made by a molding process since it is entirely one-piece and made from a resilient vinyl material. Toy 10 includes a ring-shaped central core 12 having a round solid cross section. Core 12 has a plurality of integral, radially extending discs or fins 14 which are spaced uniformly from each other. Fins 14 define a plurality of gaps 16 between the fins. Toy 10 will provide masticatory exercise for a dog chewing the toy. However, it will not perform much, if any, tooth scaling since the fins 14 and gaps 16 are not specifically sized and configured to provide such.

FIGS. 2 through 7 illustrate toy 20 of the present invention which is specifically designed to provide the dog with dental prophylaxis and masticatory exercise. The unique design accomplishes this by scraping the dog's teeth and gingiva or gums as the dog chews the toy.

Toy 20 has a body 22 which is preferably made from natural rubber by an injection molding process at conventional pressures and temperatures of about 300 tons and at 300° F., respectively. Conventional additives should preferably be added to the rubber to provide it with a hardness between about 30 and 70 durometers, ideally about 45 durometers.

As illustrated, the toy's body is somewhat elongate and bounded by four general surfaces, an inner surface 24, and outer surface 26, groove sides 28 and lip surfaces 30 and 32.

Figure 6:
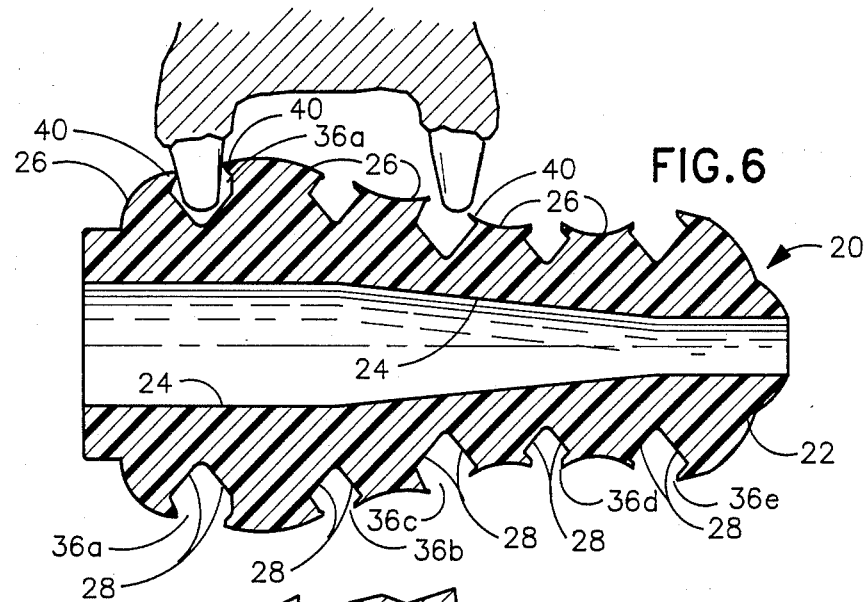
FIG. 6 is a cross sectional view similar to that of FIG. 4 additionally showing the teeth of a carnivore being inserted into the grooves of the toy of FIG. 2.

Inner surface 24 defines a hollow core 34 which extends completely through body 22 about an axis X as illustrated in FIG. 4. Core 34 is generally cylindrical. However, as illustrated in FIGS. 4 and 6 its midsection is tapered or frustoconically shaped in a fashion which generally follows the toy's elongated contour. Tapering is important for purposes of providing the toy's body 22 with a relatively uniform thickness in certain areas, the importance of which will be discussed in detail below.

Groove sides 28 and lip surfaces 30 and 32 of FIG. 5 define a generally V-shaped groove 36a having a root 38. The V-shape of the groove preferably has an included angle between about 60° and 100°. 80° is illustrated. However, root 38 of the groove is not preferably sharp. Preferably, root 38 is rounded. A sharp root 38 is to be avoided, if possible, since it could provide a point from which cracks could propagate.

Body 22 is also provided with four other grooves which are labeled, respectively, as grooves 36b through 36e. Each groove extends circumferentially around outer surface 26 of body 22 in a fashion whereby all the grooves are axially aligned along axis X.

Grooves 36a and 36c are spaced a preselected distance apart from each other to accommodate, respectively, the left and right upper fourth premolars of most dogs engaging one side of the toy, and the left and right lower first molars of most dogs engaging the other side of the toy. Appropriately sized toys are designed to accommodate the different lengths and widths of mandible and maxilla seen in the various breeds of dogs. Grooves 36a and 36c are also preferably sized and configured to scrape plaque and other debris from the aforementioned teeth and gingiva of dogs. The dimensions for medium size dogs are those shown in FIG. 4 which are drawn very close to scale.

Grooves 36b and 36d as illustrated in FIG. 4 are similar to 36a and 36c. However, 36b and 36d are specifically sized and configured and spaced from one another to provide dental prophylaxis for most dogs left and right molars, whether they be upper or lower molars.

Groove 36e is specifically designed to provide dental prophylaxis for the long canine teeth of most dogs. The canine tooth's length requires, as illustrated, that at least one groove side 28 of groove 36e be long enough to provide dental prophylaxis. FIG. 4 which is drawn to scale, illustrates preferred groove sizes and configuration for medium size dogs, i.e., dogs in the 20 to 45 pound range.

Returning to FIG. 5, it can be seen that surface 30 is beveled at either an upper or downward 45° angle with respect to axis X, the upper or downward direction of the angle depending on which side of the groove the surface is located. Surface 32 which adjoins surface 30 runs perpendicular to axis X and has a length of 0.032 of an inch as mentioned along axis X. Surface 30 has a vertical length of 0.050 of an inch as measured along axis X. Surfaces 30, 32 and adjacent outer surface 26 define a functional prophylaxis lip 40. One lip 40 is preferably located on each side of grooves 36 at the entrance or top of each groove 36 between each groove side 28 and the toy's adjacent outer surface 26 as such is illustrated in FIG. 4.

Figure 7:
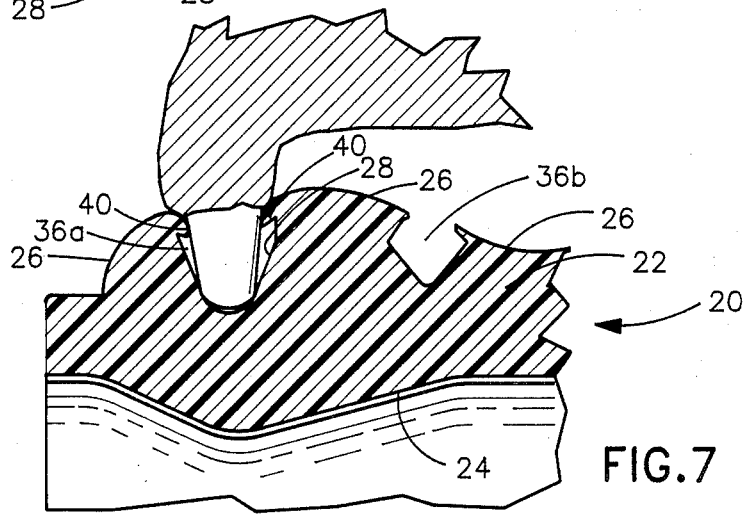
FIG. 7 is an enlarged partial cross sectional view showing a tooth of a carnivore fully inserted into a groove of the toy of FIG. 2.

Functional prophylaxis lips 40 significantly enhances plaque removal by toy 20 by providing a pair of surfaces which scrape the dog's teeth and gingiva as they are inserted into and withdrawn from a groove. The lips provide dental prophylaxis since they remain in contact with the tooth surface as the tooth is being lowered into and withdrawn from the groove (See FIGS. 6 and 7). Moreover, by bending downwardly as depicted in FIG. 7, lips 40 permit the tooth to be fully inserted into each groove 36. This enables the lips to provide dental prophylaxis to the side and neck of the tooth, but also enables the lips to provide dental prophylaxis to the dog's gingiva or gums which surround the tooth's neck.

Enhanced dental prophylaxis and gum massaging is also provided by making the toy's body 22 out of an elastomeric material such as natural rubber having a hardness ideally around 45 durometers as previously mentioned. The resilience of natural rubber having such a hardness provides the toy with the ability to bounce, thereby attracting the dog's interest and insuring that the dog will play with the toy to receive the desired masticatory exercise and dental cleaning. In addition, such elasticity (or hardness) enables stretching or elongation of a groove 36 when a dog bites down upon the groove with a tooth located in the groove. This stretching of the groove causes the groove's sides and lips to move inwardly toward each other. This inward action causes lips 40 to in effect, engage or clamp the dog's tooth and surrounding gingiva thereby scraping the tooth and gingiva as the dog chews.

To facilitate such stretching of the grooves, it is also important that the body's thickness between each groove root 38 and the inner surface 24 defining the core be thin enough to allow this portion of the body to bow inwardly into the core as such, as illustrated in FIG. 7. This bowing action facilitates full insertion of the tooth into the groove which, in turn, facilitates stretching or elongation of the groove. In the embodiment illustrated having a body made of a material having a hardness of about 45 durometers, the body's thickness between each groove root 38 and inner surface 24 defining core 34 should preferably be between about ⅛ and ⅜ of an inch. Anything less than ⅛ of an inch will probably be too weak and will probably tear after the toy has been chewed by a dog for a while. Anything thicker than ⅜ of an inch and having a hardness of about 45 durometers will probably be too thick to permit the aforementioned bowing and groove stretching.

Flavoring additives may also be added to the material from which the toy's body is to be made during the injection molding process. Such additives will enhance the toy's appeal to a dog, thereby making it more likely that the dog will play with the toy and benefit from the dental cleaning and masticatory exercies provided by the toy. Also, oral hygiene substances can be added along the functional prophylaxis lip to enhance the benefit of the toy to the dog's teeth and gingiva.

Based on the foregoing description, those skilled in veterinary medicine, particularly those interested in the dental aspects of veterinary medicine, will readily appreciate that the present invention provides a pet toy which not only provides masticatory exercise for a dog, but also provides dental prophylaxis for the dog's teeth and gingiva as the dog chews the toy. Moreover, the unique design of the toy provides massaging of the dog's gingiva which surrounds the neck of a tooth being scraped by the toy.

The invention has been described in detail with particular references to a preferred embodiment thereof, but it will be understood that variations and modifications can be effected within the spirit and scope of the invention.

We claim:

1. A dental hygienic play toy for performing dental prophylaxis on the teeth of a carnivore as said toy is chewed by the carnivore, said toy comprising:
an elastomeric elongated body having a longitudinal axis extending in the direction of said body's elongation, said body; defining an outer surface, a plurality of grooves extending circumferentially about said body and said longitudinal axis; formed in; said outer surface and having spaced sides, and a functional prophylaxis lip located between at least one of said sides of each groove and said toy's associated adjacent outer surface, said lip partially projecting over opening of the each groove and being sized and configured to scrape a tooth as it is inserted into and partially withdrawn from groove each as the carnivore chews said toy.

2. A toy, as claimed in claim 1, wherein said body has an inner surface defining a hollow core.

3. A toy, as claimed in claim 1, wherein one of said lips is located between each groove side and said toy's associated adjacent outer surface so that each said groove is provided with a pair of said lips, said lips of said pair being oriented so as to oppose each other.

4. A toy, as claimed in claim 3, wherein each lip as a surface which is flush with said toy's associated adjacent outer surface.

5. A toy, as claimed in claim 1, wherein said outer surface extending between adjacent grooves is convex.

6. A dental hygienic play toy for performing dental prophylaxis on the teeth of a dog or other carnivore as said toy is chewed by the carnivore, said toy comprising:
an elastomeric elongated body of predetermined hardness, said body having an inner surface, an outer surface and a longitudinal axis; a plurality of grooves extending circumferentially about said body and said axis and formed in; said outer surface and having spaced sides, each said groove being sized and configured to scrape plaque and other debris from a tooth of a carnivore which is repeatedly inserted into the groove and at least partially withdrawn therefrom as the carnivore chews the toy said inner surface defining an inner hollow core lying along said axis which core enhances tooth scraping when a carnivore bites down upon the toy with a tooth located in one of said grooves by providing said toy body with the capability of resiliently bowing into the hollow core which, in turn, facilitates elongation of said groove thereby causing opposing sides of said groove to move inwardly towards each other, said groove sides thereby engaging a carnivore's tooth located in said groove to scrape the tooth's side and neck and the carnivore's gingiva surrounding the tooth's neck as the carnivore chews the toy, said body having a hardness which facilitate bowing of the body into the hollow core and elongation of said groove and a functional prophylaxis lip located between at least one of said groove sides and said toy's associated adjacent outer surface, said lip partially projecting over the opening of said groove and being sized and configured to scrape a tooth as it is inserted into and partially withdrawn from said groove as the carnivore chews said toy.

7. A toy, as claimed in claim 6, wherein said functional prophylaxis lip is sufficiently resilient so as to bend downwardly towards the root of said groove as the tooth is being inserted into said groove, said lip also being sufficiently hard so that said lip scrapes the tooth as the tooth enters said groove and as said lip is bending downwardly.

8. A toy, as claimed in claim 6, wherein said body defines a functional prophylaxis lip between each groove side and the toy's associated adjacent outer surface.

9. A toy, as claimed in claim 6, wherein at least one of said grooves is generally V-shaped such that said groove sides form an included angle between about 60° and 100°.

10. A toy, as claimed in claim 6, wherein at least one of said grooves has a root which is rounded.

11. A toy, as claimed in claim 6, wherein at least one of said grooves is generally V-shaped such that said groove sides form an included angle of about 80°.

12. A toy, as claimed in claim 6, wherein at least one of said grooves has a depth which, when elongated, enables said lip to massage that portion of a carnivore's gingiva which surrounds the neck of a tooth having been inserted into said groove.

13. A toy, as claimed in claim 6, wherein two of said grooves are sized and configured and spaced a preselected distance from one another so as to enable dental prophylaxis of a carnivore's right and left molars simultaneously.

14. A toy, as claimed in claim 6, wherein two of said grooves are sized and configured and spaced a preselected distance from one another so as to enable scraping of a right and left premolar simultaneously.

15. A toy, as claimed in claim 6, wherein at least one of said grooves is sized and configured to clean canine teeth, said groove having one of its said groove sides substantially higher than its other said groove side.

16. A toy, as claimed in claim 6, wherein said body's thickness between the root of each groove and the inner surface defining the core is between about $\frac{1}{4}$ and $\frac{3}{8}$ of an inch.

17. A toy, as claimed in claim 6, wherein said body is made from an elastomeric material having a hardness between about 30 and 70 durometers.

18. A toy, as claimed in claim 6, wherein said body is injected molded natural rubber having a hardness of about 45 durometers.

19. A toy, as claimed in claim 6, wherein said hollow core is generally cylindrical.

20. A toy, as claimed in claim 6, wherein said circumferentially extending grooves are axially aligned about said axis.

21. A toy, as claimed in claim 6, further including:
an oral hygiene substance provided along said functional prophylaxis lip.

* * * * *

UNITED STATES PATENT AND TRADEMARK OFFICE
CERTIFICATE OF CORRECTION

PATENT NO. : 4,802,444

DATED : February 7, 1989

INVENTOR(S) : Joseph P. Markham and Peter Emily

It is certified that error appears in the above-identified patent and that said Letters Patent is hereby corrected as shown below:

```
    Column 5, line 33, delete ";";
             line 35, delete ";" (both occurences);
             line 40, after "over", insert --the--; and
after "of", delete "the";
             line 42, after "from", insert --each--;
             line 43, delete "each";
             line 51, delete "as" (second occurence) and
insert --has--;

Column 6, line 17, after "groove", insert --;--;
             line 33, delete "the" and insert --said--.
```

Signed and Sealed this

Thirteenth Day of February, 1990

*Attest:*

JEFFREY M. SAMUELS

*Attesting Officer*     *Acting Commissioner of Patents and Trademarks*